United States Patent [19]
Yanahira et al.

[11] Patent Number: 5,844,104
[45] Date of Patent: Dec. 1, 1998

[54] METHOD OF PREPARING A COMPOSITION CONTAINING A HIGH AMOUNT OF GANGLIOSIDE

[75] Inventors: Shuichi Yanahira, Tsurugashima; Kiyoshi Tatsumi, Iruma, both of Japan

[73] Assignee: Snow Brand Milk Products Co., Ltd., Hokkaido, Japan

[21] Appl. No.: 838,827

[22] Filed: Apr. 10, 1997

[30] Foreign Application Priority Data

Apr. 26, 1996 [JP] Japan ..................... 8-107094

[51] Int. Cl.⁶ .............. C07H 15/00; C07H 1/08
[52] U.S. Cl. ............ 536/18.5; 536/17.2; 536/17.9; 536/124; 536/127
[58] Field of Search .............. 536/17.2, 17.9, 536/124, 127

[56] References Cited

U.S. PATENT DOCUMENTS 4,710,490  12/1987  Catsimpoolas et al. ............ 514/25

FOREIGN PATENT DOCUMENTS 2207090  8/1990  Japan .
6072819  4/1995  Japan .

OTHER PUBLICATIONS

Jennemann et al. *Lipids* 1994, 29(5), 365–368.

K. Takamizawa, M. Iwamori, M. Mutai and Y. Nagai, Gangliosides of Bovine Milk, J. Biological Chemistry, Apr. 25, 1986, vol. 261, pp. 5625–5630.

H. Kawakami, Y, Ishiyama and T. Idota, Stability of Milk Gangliosides And Formation Of $G_{D3}$ Lactone Under Natural Acidic Conditions, Biosci. Biotech. Biochem., vol. 58, 1994, pp. 1314–1315.

*Primary Examiner*—Kathleen K. Fonda
*Attorney, Agent, or Firm*—Townsend & Banta

[57] ABSTRACT

A method of preparing a composition containing a high amount of Ganglioside which comprises the steps of: (1) adding ethanol to a material containing Ganglioside so as to have a concentration of ethanol of 30 to 70 volume % and recovering the precipitated fraction containing Ganglioside; (2) adding ethanol to the recovered fraction containing Ganglioside so as to have a concentration of ethanol of 70 to 90 volume % and removing the precipitated proteins; and, (3) treating the fraction containing Ganglioside from which the proteins have been removed, with a membrane.

6 Claims, No Drawings

METHOD OF PREPARING A COMPOSITION CONTAINING A HIGH AMOUNT OF GANGLIOSIDE

BACKGROUND OF THE INVENTION

1. Field of the invention

The present invention relates to a method of preparing a composition containing a high amount of Ganglioside. Since the composition prepared by the method of the present invention contains a high amount of Ganglioside, it is useful for a raw material for various foods, beverages, pharmaceuticals and chemical products and the like.

2. Prior Arts

Ganglioside is a general name of sphingoglycolipid having sialic acid, and existences of various molecular species thereof are known. With respect to Ganglioside derived from milk, Nagai et al. have made clear the morphologies thereof (J.Biol.Chem., vol.261, pp.5625–5630, 1986).

In recent years, biochemical researches relating to Ganglioside have been conducted enthusiastically. A variety of physiological functions of Ganglioside concerning cell differentiation, cell growth, nervous function, canceration, protection against viruses infection and the like are being elucidated.

The Ganglioside exists in milk fat globule membranes, cell membranes of animal cells, or animal brains and the like. Since the milk fat globule membranes are contained in a milk product such as cream or processed cream product in a large amount, a material containing a large amount of Ganglioside is generally considered to contain a large amount of lipids such as triglycerides and phospholipids.

In the past, as a method of preparing a composition containing a high amount of Ganglioside, a method of obtaining fat globule membranes from butter milk (Japanese Un-Examined Patent Publication No. Sho 60-72819), and a method of obtaining a composition from a material containing Ganglioside using an ion-exchange resin (Japanese Un-Examined Patent Publication No. Hei 2-207090) were known. However, with the former method, it is difficult to prepare a composition containing a high amount of Ganglioside on an industrial scale. And, with the latter method, there exists a problem as regards a large amount treatment due to the usage of the ion-exchange resin although the method has an advantage that a composition containing a high amount of Ganglioside may be prepared.

Therefore, a method of preparing a composition containing a high amount of Ganglioside effectively and quickly on a large scale have been desired.

SUMMARY OF THE INVENTION

Thus an object of the present invention is to provide a method of preparing a composition containing a high amount of Ganglioside which may be used as a raw material for foods, beverages, pharmaceuticals, chemical products and the like.

Another object of the present invention is to provide a method of preparing a composition containing a high amount of Ganglioside effectively and quickly, on an industrial scale.

The present inventors have researched earnestly so as to dissolve the above problems with respect to the method of preparing a composition containing a high amount of Ganglioside, and have found that a composition containing a high amount of Ganglioside can be prepared effectively and quickly on a large scale, by treating with ethanol a material containing Ganglioside such as milk or a milk product, being a starting material, and treating it with a membrane, and thus completed the present invention.

Thus there is provided a method of preparing a composition containing a high amount of Ganglioside which comprises the steps of:

(1) adding ethanol to a material containing Ganglioside so as to have a concentration of ethanol of 30 to 70 volume % and recovering the precipitated fraction containing Ganglioside;

(2) adding ethanol to the recovered fraction containing Ganglioside so as to have a concentration of ethanol of 70 to 90 volume % and removing the precipitated proteins; and, (3) treating the fraction containing Ganglioside from which the proteins have been removed, with a membrane.

Further, there is provided the method of preparing a composition containing a high amount of Ganglioside, wherein the step (3) of treating with a membrane is carried out in a concentration of ethanol of 30 volume % or less.

Further, there is provided the method of preparing a composition containing a high amount of Ganglioside, wherein the material containing Ganglioside is milk or a milk product.

Further, there is provided the method of preparing a composition containing a high amount of Ganglioside, wherein the milk product is butter milk, butter curd or whey protein concentrates (WPC).

Further, there is provided the method of preparing a composition containing a high amount of Ganglioside, wherein the material is animal brain and the other organs.

Further, there is provided the method of preparing a composition containing a high amount of Ganglioside, wherein the membrane is an ultrafiltration membrane or a precision-filtration membrane.

DETAILED DESCRIPTION OF THE INVENTION

The method of preparing a composition containing a high amount of Ganglioside which comprises the steps of:

(1) adding ethanol to a material containing Ganglioside so as to have a concentration of ethanol of 30 to 70 volume % and recovering the precipitated fraction containing Ganglioside;

(2) adding ethanol to the recovered fraction containing Ganglioside so as to have a concentration of ethanol of 70 to 90 volume % and removing the precipitated proteins; and, (3) treating the fraction containing Ganglioside from which the proteins have been removed, with a membrane.

As the material containing Ganglioside which may be used in the present invention, milk, a milk product such as butter milk, butter curd and whey protein concentrate (WPC), animal brains and the other organs may be exemplified. The materials containing Ganglioside may be concentrated to be used, or may be dried and dissolved in water to be used.

The method of preparing a composition containing a high amount of Ganglioside of the present invention will be detailed hereinafter.

First, ethanol is added to the composition containing Ganglioside so as to have a concentration of ethanol of 30 to 70 volume %, and the precipitated fraction containing Ganglioside is recovered by means of a treatment such as centrifuging. By such addition of ethanol to have a concentration of ethanol of 30 to 70 volume %, the fraction containing Ganglioside and the other fractions may be separated effectively.

Then, ethanol is added to the fraction containing Ganglioside so as to have a concentration of ethanol of 70 to 90 volume %, and the precipitated proteins are removed by means of a treatment such as centrifuging, filter press or decantation.

Then, the fraction is treated with a membrane such as an ultrafiltration membrane and precision filtration membrane in order to remove the ethanol, salts and the other low-molecular materials to obtain a composition containing a high amount of Ganglioside. When the treatment with a membrane is carried out, it is preferable to add water to the fraction so as to have a concentration of ethanol of 30 volume % or less. If the concentration of ethanol exceeds 30 volume %, micelles formed by Ganglioside will be destructed, and Ganglioside will be filtered through the membrane, and thus yield will be decreased.

The composition containing a high amount of Ganglioside in such a way may be dried appropriately to pulverize, and may be used as a raw material for various foods, beverages, pharmaceuticals, chemical products and the like.

The composition containing a high amount of Ganglioside of the present invention contains at least 4 weight % of Ganglioside on a dry basis.

EXAMPLES

The present invention will be detailed in more detail with the following Examples, hereinafter. The amounts of Ganglioside in each Examples were quantified according to the method reported by Kawakami (Biosci. Biotech. Biochem., vol.58, pp.1314–1315, 1994).

Example 1

HP butter was melted at 80° C., and centrifuged so as to remove butter oil and freeze-dried. 1 kg of butter curd powder thus obtained was dissolved in 100L of water. To the butter curd solution, 220L of ethanol was added. After stirring, it was centrifuged (2,500 rpm) at room temperature, and the precipitates containing Ganglioside were recovered. Then, after dissolving the precipitates in 10L of water, 90L of ethanol was added to it, and the precipitated proteins were removed by a filter press. To the solution from which the proteins had been removed, water was added so as to control the concentration of ethanol to 30 volume % or less and so as to control the total liquid amount to 400L. It was ultrafiltered by an ultrafiltration membrane having a fractional molecular weight of 500,000 (Cefilt ; manufactured by Nihon Gaishi Co., Ltd.) . As to the conditions of the ultrafiltration, the concentration was to be 80 times, the water added concentration was to be three times, and the temperature was to be 25° C.

Thus 5L of the concentrated solution containing Ganglioside was recovered and freeze-dried to obtain 50 g of powders of a composition containing 5 weight % of Ganglioside. The composition containing a high amount of Ganglioside contained 50 weight % of phospholipids, 2 weight % of neutral fats, 2 weight % of proteins and 2 weight % of minerals. The yield of Ganglioside was 98%, and the concentration rate of Ganglioside was 20 times.

Example 2

5 kg of WPC powders (Alasen 475, made in New Zealand) were suspended in 250L of water. After adding 550L of ethanol to the WPC solution and stirring, it was centrifuged (2,500 rpm) at room temperature to recover the precipitates containing Ganglioside. Then, after dissolving the precipitates in 5L of water, 45L of ethanol was added to it, and it was decanted so as to remove the precipitated proteins. Then, to the solution from which the proteins had been removed, water was added so as to control the concentration of ethanol to 30 volume % or less and so as to control the total liquid amount to 200L. It was precision-filtered using a precision-filter membrane having a pore diameter of 0.211 m (Carbosep M20; manufactured by Tech-Sep Co. ,Ltd.) . As to the condition of the precision filtration, the concentration was to be 100 times, the water added concentration was to be three times, and the temperature was to be 40° C.

Thus, 2L of the concentrated solution containing Ganglioside was recovered and freeze-dried to obtain 39 g of powders of a composition containing 7.2 weight % of Ganglioside. The composition containing a high amount of Ganglioside contained 70 weight % of phospholipids, 2 weight % of neutral fats, 2 weight % of proteins and 3 weight % of minerals. The yield of Ganglioside was 95% and the concentration rate of Ganglioside was 120 times.

Example 3

50L of ethanol was added to 30L of butter milk which may be obtained as a by-product of butter manufacturing. After stirring, it was centrifuged (2,500 rpm) at room temperature so as to remove the precipitates containing Ganglioside. Then, after dissolving the precipitates in 2L of water, 18L of ethanol was added to it, and it was centrifuged (3,000 rpm) at room temperature to remove precipitated proteins. Then, water was added to the solution from which the proteins had been removed, so as to control the concentration of ethanol to 30 volume % or less and so as to control the total liquid amount of 180L. It was ultrafiltered using an ultrafiltration membrane having a fractional molecular weight of 500,000 (Cefilt; manufactured by Nihon Gaishi Co.,Ltd.). As to the conditions of the ultrafiltration, the concentration was to be 100 times, the water added concentration of was to be three times and the temperature was to be 30° C.

Thus, 1.8L of the concentrated solution containing Ganglioside was removed and freeze-dried to obtain 40 g of powders of a composition containing 6 weight % of Ganglioside.

The composition containing a high amount of Ganglioside contained 55 weight % of phospholipids, 5 weight % of neutral fats, 1 weight % of proteins and 2 weight % of minerals. The yield of Ganglioside was 96% and the concentration rate of Ganglioside was 60 times.

With the method of the present invention, a composition containing a high amount of Ganglioside can be prepared effectively and quickly on an industrial scale. Thus the composition containing a high amount of Ganglioside which may be used as a raw material for foods, beverages, pharmaceuticals and chemical products, can be provided at a low cost by the method of the present invention.

What is claimed is:

1. A method of preparing a composition containing ganglioside which comprises the steps of:

(1) extracting a material containing ganglioside with ethanol so that the concentration of ethanol is 30 to 70 volume %, and recovering a first precipitate, (2) reextracting the first precipitate with ethanol so that the concentration of ethanol is 70 to 90 volume %, and recovering resulting precipitated proteins, and (3) passing the liquid fraction from which the precipitated proteins had been removed resulting from step (2) through a membrane to yield a liquid fraction containing ganglioside.

2. The method of claim 1, wherein step (3) of treating with a membrane is carried out in a concentration of ethanol of 30 volume % or less.

3. The method of claim 1, wherein material containing ganglioside is milk or a milk product.

4. The method of claim 3, wherein the milk product is butter milk, butter curd or whey protein concentrates (WPC).

5. The method of claim 1, wherein the material containing ganglioside is animal brain or animal organs.

6. The method of claim 1, wherein the membrane if an ultrafiltration membrane or a precision-filtratic membrane.

* * * * *